D. B. COOK.
SCARIFIER.
APPLICATION FILED AUG. 29, 1912.

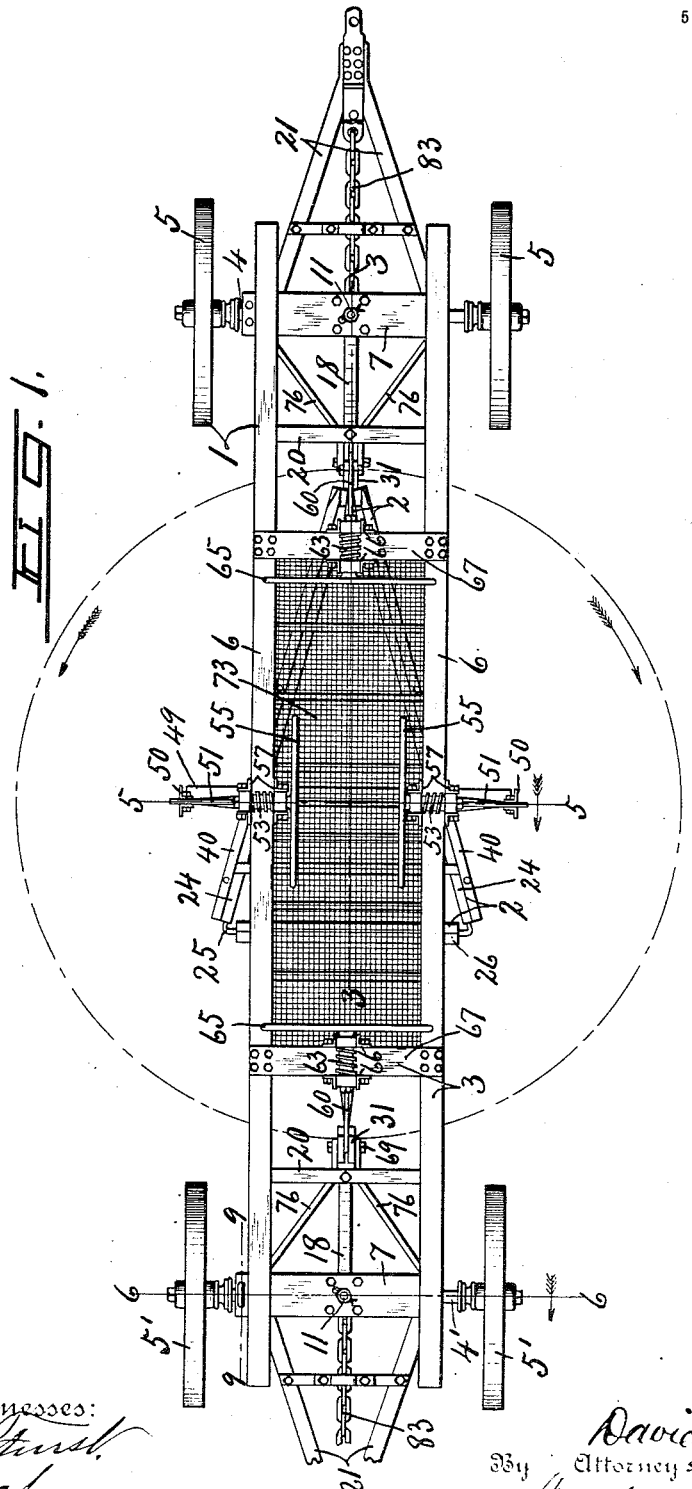

1,134,945.

Patented Apr. 6, 1915.
5 SHEETS—SHEET 2.

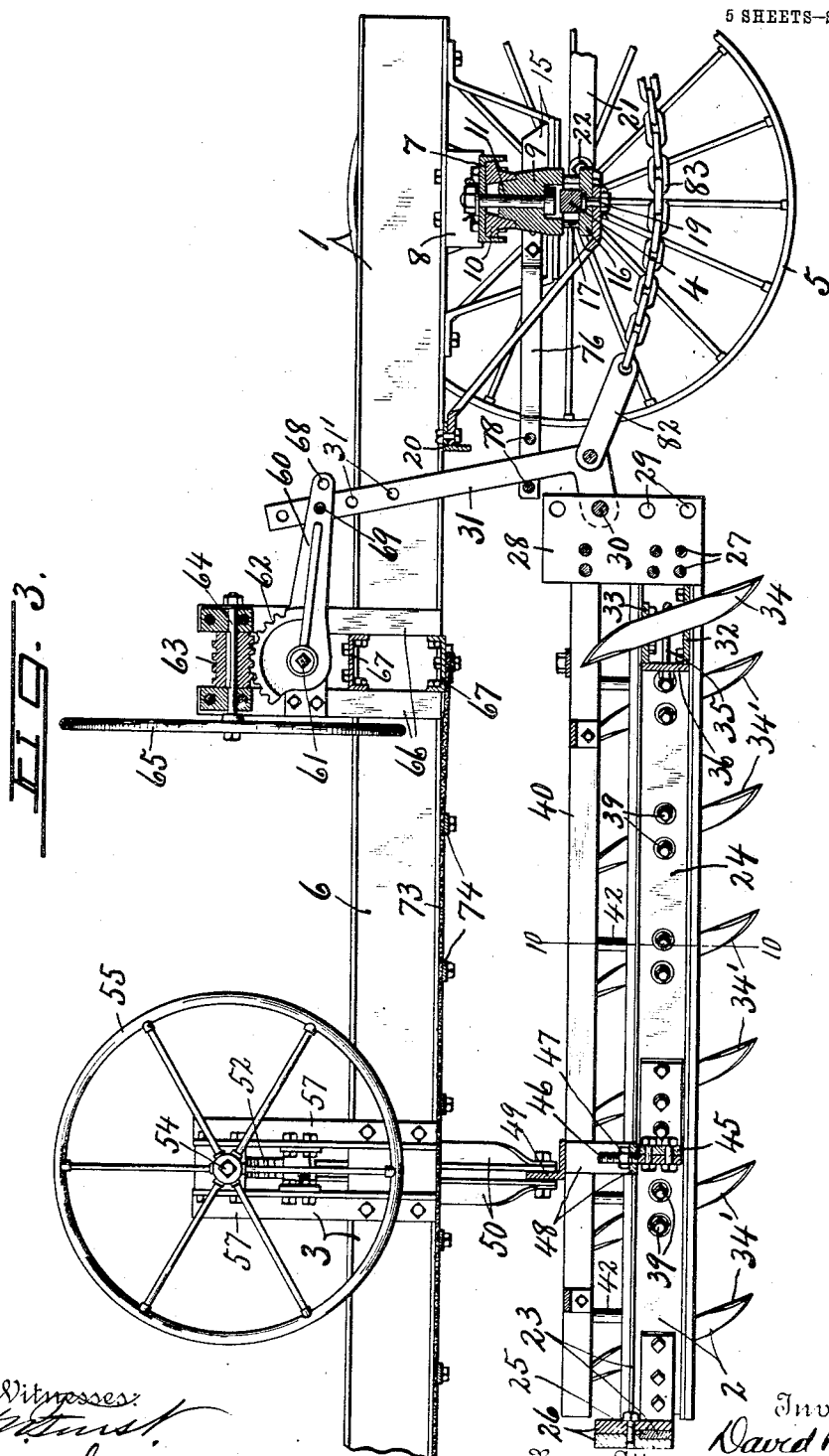

D. B. COOK.
SCARIFIER.
APPLICATION FILED AUG. 29, 1912.
1,134,945.
Patented Apr. 6, 1915.
5 SHEETS—SHEET 4.
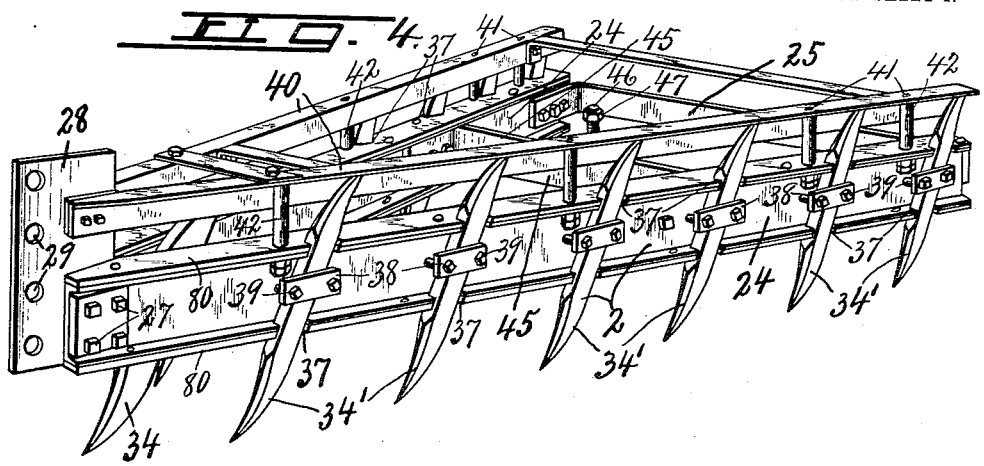
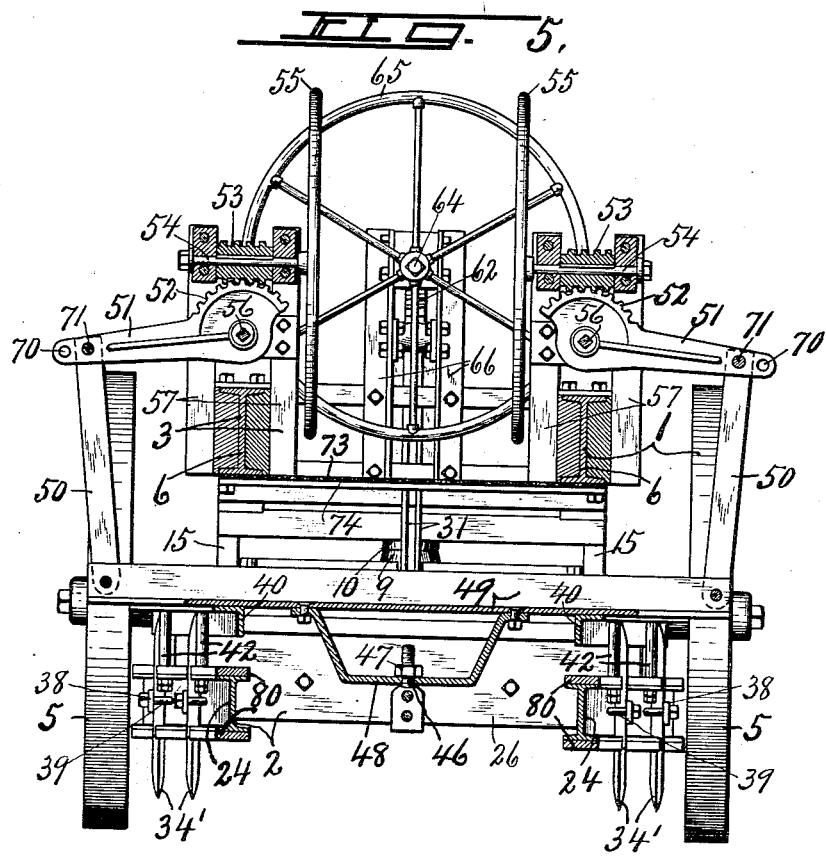

D. B. COOK.
SCARIFIER.
APPLICATION FILED AUG. 29, 1912.
1,134,945.
Patented Apr. 6, 1915.
5 SHEETS—SHEET 5.
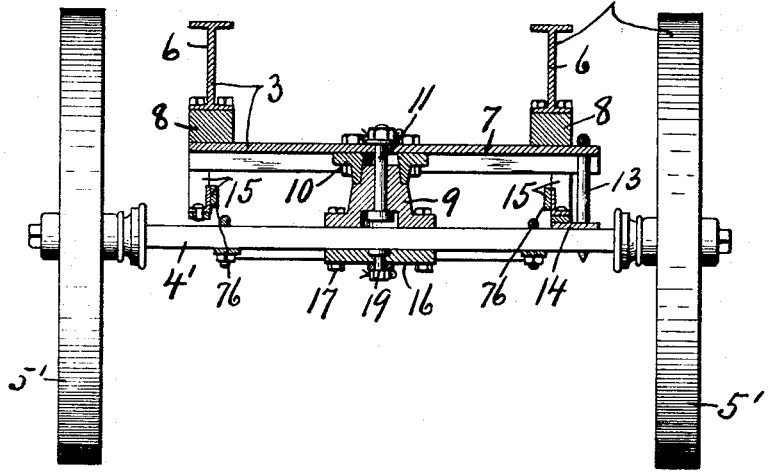
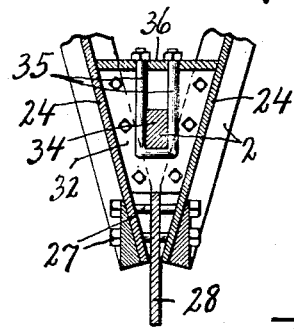
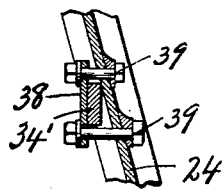
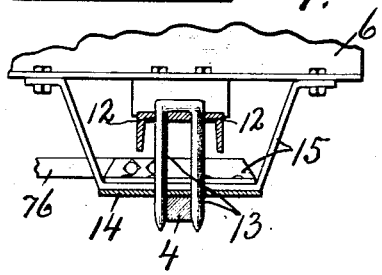
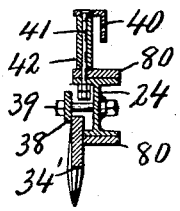

UNITED STATES PATENT OFFICE.

DAVID B. COOK, OF FRANKFORT, NEW YORK, ASSIGNOR TO ACME ROAD MACHINERY COMPANY, OF FRANKFORT, NEW YORK, A CORPORATION OF NEW YORK.

SCARIFIER.

1,134,945.  Specification of Letters Patent.  Patented Apr. 6, 1915.

Application filed August 29, 1912. Serial No. 717,820.

*To all whom it may concern:*

Be it known that I, DAVID B. COOK, of Frankfort, in the county of Herkimer, in the State of New York, have invented new and useful Improvements in Scarifiers, of which the following, taken in connection with the accompanying drawings, is a full, clear, and exact description.

This invention relates to certain improvements in scarifiers adapted to be used more particularly in tearing up and loosening road beds or pavements preparatory to trenching, excavating, grading and resurfacing and similar operations which may be necessary in road building or trenching for water pipes, sewers and other conduits which it may be desired to place under the road bed. In most instances these road beds are extremely hard and are difficult to penetrate and, under the method commonly used of plowing, the work is not only unusually expensive and laborious, but requires considerable power, and results in frequent breakages of the apparatus employed and renders the use of mechanical motive power (which is preferable) impractical. Furthermore, it is frequently necessary to use apparatus of this character upon narrow road beds or highways where it is impossible, or at least inconvenient, to turn the entire apparatus around for operation in reverse directions along such road bed.

The main object, therefore, of my present invention is to render this scarifying operation more efficient and less laborious than has heretofore been practised and, at the same time, to permit the machine to be drawn or propelled from either end with a minimum degree of motive power. In other words, I have sought to mount the scarifying implement upon the underside of a four wheel truck in such manner that it may be reversed end for end according to the direction of movement of the truck without turning the latter around and, at the same time, to enable the truck to be propelled from either end by a traction engine or other motive power.

Another object is to provide the scarifier with forwardly converging rows of teeth disposed at an acute angle to each other, the teeth of opposite rows being spaced longitudinally substantially equal distances apart but transversely at gradually increasing distances from front to rear so as to cause them to travel in lines parallel with and at opposite sides of the center line of draft thereby reducing and more evenly distributing the load or resistance offered by the entrance of the teeth into the road bed and, at the same time, causing the machine to travel more easily along the separate line of draft with less liability of swerving to right or left.

A further object is to provide simple means for raising and lowering the scarifying implement to gage the depth of cut according to the nature of the ground and also to permit the tooth-supporting frame to be raised clear of the ground when necessary in transporting the machine from one locality to another.

A still further object is to counterbalance the scarifying implement or tooth-supporting frame upon a suitable swivel disposed in such manner that the said tooth-supporting frame may be easily and quickly reversed end for end or tilted vertically in any direction to different angles to and from a horizontal plane.

Other objects and uses relating to specific parts of the machine will be brought out in the following description.

In the drawings—Figures 1 and 2 are respectively a top plan and side elevation of a road scarifier embodying the various features of my invention. Fig. 3 is an enlarged longitudinal vertical sectional view of the greater portion of one end of the machine taken on line 3—3, Fig. 1. Fig. 4 is a perspective view of the detached scarifying implement or tooth-supporting frame shown in Figs. 1, 2, and 3 except that the counterweight is removed. Figs. 5 and 6 are enlarged transverse vertical sectional views of the same machine taken respectively on lines 5—5 and 6—6, Fig. 1. Figs. 7 and 8 are enlarged detail sectional views of portions of the scarifying implement taken respectively on lines 7—7 and 8—8, Fig. 2. Fig. 9 is an enlarged detail vertical sectional view through one of the axles and adjacent portions of the super-structure showing more particularly the means for locking the axle against turning. Fig. 10 is a transverse vertical sectional view through one side of the scarifier frame showing more particularly the guard rails and fastening means therefor.

As illustrated, this machine comprises a four wheel truck —1— and a scarifying implement —2—, flexibly and reversibly mounted thereon, together with suitable means for raising, lowering and tilting the scarifying implement as may be desired in gaging the depth of cut or in clearing the teeth from the surface of the ground when transporting the machine from one place to another.

The truck —1— preferably consists of an elongated rectangular frame —3— of considerably greater length than that of the scarifying implement —2— and adapted to be supported at its ends in the manner hereinafter described upon suitable axles —4— and —4'—, each of the latter being provided with a pair of wheels —5— and —5'—.

The main supporting frame —3— of the truck preferably consists of a pair of I-beams —6— running parallel to each other lengthwise of the machine and spaced a suitable distance apart transversely at the inner sides of the adjacent wheels —4— and —4'—, the opposite ends of said beams being connected or tied together by transverse channel-bars —7— and —7'— together with suitable filling blocks —8— which are interposed between the ends of the channel bars and under sides of the adjacent portions of the I-beams.

The channel bars —7— and —7'— forming parts of the main supporting frame are disposed directly above and some distance from their respective axles —4— and —4'— horizontally and parallel therewith. The central portions of the bars —7— and —7'— and corresponding axles —4— and —4'— are connected to each other by telescoping fifth wheel sections —9— and —10— and king bolts —11—, the sections —9— being secured by suitable fastening means to their respective axles —4— and —4'— while the sections —10— are suitably secured to the undersides of the respective channel bars —7— and —7'—, the connection between each fifth wheel section —9— and its companion —10— permitting the corresponding axles to turn easily in either direction in a horizontal plane for steering purposes while the king bolt —11— serves to hold the corresponding fifth wheel sections in operative engagement and also facilitates the turning action of the axles referred to. It is now apparent that the wheels and axle at either end of the machine may be used for steering purposes and that the machine may be, therefore, drawn or propelled from either end without turning the machine around when operating in narrow or cramped places. It is preferred, however, to lock the axle at one end of the machine against turning when the motive power is attached to the opposite end and for this purpose one end of each of the cross-bars —7— is extended a short distance beyond the adjacent I-beams and is provided with a pair of apertures —12— for receiving a U-shape locking bolt —13— which is also passed through vertically alined apertures in an underlying plate —14— and engaged with the front and rear faces of the adjacent portion of the axle thereby firmly locking said axle against turning in either direction and permitting the same bolt to be used for locking either axle.

The plates —14— extend lengthwise of the machine and in addition to their function for receiving the lower end of the locking bolt —13—, serve as additional supporting guides along which the adjacent ends of the axles are adapted to turn, said plates being secured by brackets —15— to the underside of the overlying portions of the I-beams as shown more clearly in Fig. 9.

Suitable clip plates —16— are secured by bolts —17— to the underside of the central portions of the axles —4— and —4'— and also to the superposed fifth wheel sections —9— for strengthening the axles at these points, said axles being additionally braced against forward and rearward movement by braces —18— which are secured at one end by bolts —19— to the underside of the clip plates —16— co-axially with the adjacent king bolts —11— and their opposite ends are secured to the central portions of cross bars —20— connecting the I-beams —6— some distance to the inner sides of the cross bars —7— and —7'— as shown more clearly in Figs. 1, 2, and 3.

Suitable draw-heads or draft appliances —21— are hinged or pivoted at one end by bolts —22— to their respective axle sections —4— and —4'— and their outer or opposite ends are adapted to receive a pole, link or other connection with a traction engine or other motive power.

The scarifying implement or tooth-supporting frame —2—, which is flexibly and reversibly mounted upon the underside of the main supporting frame —1— between the front and rear sets of wheels, comprises a triangular frame —23— of suitable length capable of being turned end for end between the wheels about a vertical axes and composed of opposite side bars or I-beams —24— of uniform length arranged at an acute angle with each other so as to diverge in substantially straight lines from one end toward the opposite ends, the latter being connected by a cross bar —25— as shown more clearly in Figs. 3 and 4. This cross bar —25— which is rigidly secured to the adjacent ends of the said bars —24— serves the double purpose of bracing and holding said side bars a uniform distance apart and also for receiving and supporting a suitable counter-weight —26— for counterbalancing the scarifying implement upon its swivel or pivotal support (presently described). The opposite or converging ends of the said bars —24— are secured by bolts —27— to opposite faces of an intervening draw-plate —28— having a series of bolt holes —29— for receiving a pivotal bolt —30— by which the adjacent end of the scarifying implement may be attached to one or the other of a pair of vertically adjustable supporting bars —31— located at opposite ends of the machine as shown more clearly in Figs. 2 and 3, said supporting bars constituting a part of the means for raising, lowering and tilting the scarifying implement.

As previously stated, the scarifier frame is arranged centrally beneath the main supporting frame —1— between the front and rear sets of wheels with its apex pointing in the direction of movement of the machine or adjacent the turning or steering axle and its longitudinal center substantially coincident with the center line of draft on the machine.

For convenience of further description, the apex of the scarifier frame will be described as "the front end" while the opposite end will be termed "the rear end."

Secured to and between the front ends of the side bars —24—, just at the rear of the draw-plate —28—, are a pair of horizontally disposed plates —32— and —33— having vertically inclined slots or openings therein for receiving a correspondingly inclined master tooth —34—, the latter being firmly held in operative position by a U-shape clip bolt —35— and a clip —36— which is drawn by the bolt —35— tightly against the rear edges of the plates —32— and —33— as shown more clearly in Figs. 3 and 7.

The outer flanges of each of the bars —24— are provided with a series of, in this instance six, vertically inclined recesses —37— for receiving a corresponding number of similarly inclined cutter bars or teeth —34'—, which are fitted with an easy sliding fit in their respective recesses to firmly hold them against longitudinal movement on the side bars of the frame and are additionally held in operative position by separate fastening devices consisting in this instance of clips —38— and bolts —39—, the latter passing through apertures in the adjacent portions of the webs of the side bars —24— as shown more clearly in Fig. 8 and thereby permitting the teeth to be adjusted vertically to bring their points into the same horizontal plane and also to compensate for wear. The main bodies or central portions of the teeth are preferably rectangular and elongated in cross section and are arranged edgewise vertically in planes substantially parallel with the longitudinal center of the frame —23— and, therefore, parallel with the line of draft so as to afford a maximum degree of rigidity in resisting the transverse strains to which the teeth may be subjected. The teeth —34'— are also spaced a uniform distance apart longitudinally of the frame and, therefore, the transverse distance between the corresponding teeth at opposite sides gradually increases from front to rear so as to cause the teeth to travel in different paths parallel with the longitudinal center of the frame and consequently with the line of draft as the machine is propelled over the road bed.

The front master tooth —34— is subjected to the most severe initial strain by reason of the fact that it is first to enter the road bed and is, therefore, made somewhat heavier than the other teeth —34'— but all of the teeth are preferably made of hardened steel properly tempered to withstand the strains to which they are subjected and are preferably of the same length and pointed at both ends so as to permit them to be reversed end for end when necessary or desirable. For example, in case the active point of one tooth should break, said tooth may be easily removed and reversed end for end and re-clamped in place without appreciable loss of time or inconvenience.

All of the teeth are positioned at substantially the same angle so as to incline downwardly and forwardly and their cutting edges are slightly curved toward the front of the frame and beveled transversely to produce a better cutting edge capable of wedging itself more effectively into the road bed or pavement and at the same time exerting an uplift of the loosened material as the machine is propelled.

A pair of rearwardly diverging guard-rails —40—, consisting in this instance of angle-irons, are secured by bolts —41— and spacing sleeves —42— to the upper sides of and parallel with the side bars —24— so as to cover the upper pointed ends of the teeth —34'— as shown more clearly in Figs. 2, 3, 4, and 5, for the purpose of reducing the liability of injury to the operator or attendants, said guard-rails being also secured at their front ends to the draw plate —28—. The scarifying implement is preferably supported at a point near its center of gravity so that it may be easily turned or reversed end for end by hand about a vertical axis or tilted in any direction relatively to such axis in the manner hereinafter described and for this purpose I have provided the frame —23— with a cross-bar —45— having its ends secured to the intermediate portions of the side bars —24— as shown more clearly in Figs. 3 and 4 and to the central portion of this cross bar is secured an upwardly projecting pivotal bolt —46— having an adjusting nut —47— which is swivelly connected to a hanger —48— on the underside of a superposed supporting bar —49—. This bar —49— extends transversely across the upper side of the scarifier frame —23— directly over the cross-bar —45— and its opposite ends are flexibly connected by links —50— to separate superposed levers —51— which are pivotally mounted in suitable bearings upon the main supporting frame —1— and are provided with toothed segments —52— meshing with superposed worms —53—. These worms —53— are secured to separate rotary shafts —54— which are journaled in suitable bearings upon the main supporting frame —1— in transverse co-axial alinement with each other some distance to opposite sides of the longitudinal center of the machine and are provided at their inner ends with separate hand wheels —55— by which the worms —53— may be rotated to rock the levers —51— upon their fulcrums —56— as shown more clearly in Fig. 5 for raising and lowering either or both sides of the scarifying implement. The bearings for the levers —51— and worm shafts —54— are mounted on upright standards consisting of angle-irons —57— which are secured to opposite sides of the I-beams —6— of the main supporting frame.

The supporting arms —31— for the front end of the scarifier frame are pivotally connected to suitable levers —60— which are fulcrumed at —61— in suitable bearings upon the main supporting frame and are provided with tooth segments —62— meshing with separate worms —63—, the latter being secured to co-axial longitudinally extending shafts —64— having hand wheels —65— by which the worms may be turned separately to operate the levers —60— and thereby raise or lower the front end of the scarifier frame through the medium of the supporting arm —31— which may be connected thereto. The bearings for the shafts —64— and —61— are mounted upon upright standards or angle-irons —66— which are secured to cross-bars —67— forming, together with the upright standards —66—, parts of the main supporting frame —3—.

The arms —31— and coöperating levers —60— are adjustable relatively to each other to facilitate the vertical adjustment of the front end of the scarifier and for this purpose are provided with a plurality of bolt openings —68— for receiving a pivotal bolt —69— by which the two parts are flexibly connected to each other. For a similar purpose the levers —51— which control the adjustment of the sides of the scarifier are provided with a plurality of bolt openings —70— at different distances from their fulcrum for receiving bolts —71— by which the arms —50— are pivotally connected to said levers.

As previously intimated the hand wheels —55—, by which the sides of the scarifier are raised and lowered separately from each other, are spaced a sufficient distance apart to permit the operator to pass readily between them, along and upon a suitable platform —73— preferably of woven wire held in place against the under side of the beams —6— by underlying transverse bars —74— which are bolted to the lower flanges of said beams, said platform extending lengthwise of the main supporting frame between the standards —66— so as to permit the operator to pass from one to the other of the hand wheels —65— for controlling the adjustment of the front end of the scarifier according to the direction of movement of the machine.

The links or arms —31— for supporting the front end of the scarifier are guided in their vertical adjustment between suitable brace bars —76— having their front ends secured to the brackets —15— and their rear ends provided with guide-bolts —78— for engaging the front and rear edges of said links as shown more clearly in Fig. 3. The adjusting devices for the front end of this scarifier including the hand wheels —65— are located equi-distant from and longitudinally at opposite sides of the adjusting device for the sides of the scarifier and approximately in the plane of the longitudinal center of the machine so that the operator may readily walk along the platform from one adjusting wheel to the other without leaving the machine.

The upper and lower flanges of the scarifier bars —24— are reinforced by lengthwise steel plates —80— riveted or otherwise secured thereto and are recessed in one side to correspond to the recesses —37— for receiving the teeth —34'— and additionally bracing them against relative movement longitudinal of the frame.

The lower ends of each of the supporting members —31— for the scarifier are connected by links —82— and chains —83— to the adjacent draw heads —21— as shown more clearly in Fig. 1 to be used as a supplemental draft device if necessary.

The nut —47— on the pivotal bolt —46— rests upon the upper surface of the hanger —48— and together with the bolt forms the main support for the scarifier about which the latter is adapted to turn end for end to cause the apex thereof to face either end of the machine according to the direction of movement thereof although the front end of said scarifier is additionally supported by the link —31— and its connection with the lever —60—.

Operation: In operating this scarifying implement, the axle, which is to be connected to the motive power through the medium of the draw-bar —21—, is unlocked for steering purposes while the axle at the opposite end of the machine will be locked against turning by means of the locking bolt —13—, under which conditions, the scarifier or tooth-supporting frame will be adjusted rotarily about the axis of its pivotal bolt —46— so as to cause its apex to face the direction of propulsion of the machine whereupon the front end or apex of the scarifier is locked by the pivotal bolt —30—
to the lower end of the link —31— which is already connected to the adjacent lever —60—. Now, assuming that the scarifier has been raised during the transportation of the machine to the locality where it is desired to tear up or loosen the road bed whereupon the scarifier may be lowered by manipulation of the adjusting wheels —55— and —65— until the teeth are caused to enter the proper distance into the ground so that, as the machine is propelled along the road, the master tooth —34— will initially cut and loosen the pavement in a more or less direct line and it will be followed successively by the remaining teeth in parallel lines a suitable distance apart according to the degree of divergence of the side bars —24— or proximity of the teeth longitudinally relatively to each other and it is evident that when the initial cut is made, by the master tooth —34—, the ground at either side thereof will be more easily loosened by the remaining teeth so that the scarified area will gradually increase in width to equal the distance between the rear teeth which is approximately equal to the width of the machine between the wheels. After completing this operation in one direction along the road bed, if it is desired to return over adjacent ground, it is simply necessary to detach the motive power, reattach it to the opposite end of the machine, remove the locking pin from the previously locked axle and place it in operative engagement with the previously unlocked axle and finally withdraw the bolt —30— from connection with the adjacent arm —31— and then swing the entire scarifier horizontally about the axis of the pivotal bolt —46— end for end and interlock its apex with the other arm —31— by means of the same bolt —30— whereupon the machine is ready for a repetition of the operation previously described but in the reverse direction. If, during either of these operations, it is desired to adjust the front teeth farther into the ground than the rear teeth, this may be accomplished by proper manipulation of the wheel —65— through the medium of the worm —63— and rack —62— of the lever—60— together with the connecting link —31— which is attached to the front end of the scarifier. On the other hand, if it is desired to cut deeper on one side than upon the opposite side of the part of the road bed being operated upon, the side requiring the deepest cut may be lowered by proper manipulation of the adjacent controlling wheel —55—. In this manner, the scarifier may be raised and lowered bodily or tilted in any direction relatively to a horizontal plane, it being understood that the connections between the scarifier and the several adjusting devices are sufficiently flexible to permit such tilting adjustment without unduly straining any of the parts.

What I claim is:

1. A road scarifier comprising a wheel truck having a scarifying implement rotatably mounted thereon for horizontal swinging adjustment end for end and means independent of the means by which the scarifying implement is mounted upon the trucks for holding said implement in its adjusted positions.

2. A road scarifier comprising a wheel truck, a bar running transversely under the truck, a frame swivel connected to the bar to rock horizontally and vertically, separate devices connected to the frame at opposite sides of the swivel for tilting said bar and thereby the frame vertically, separate rows of teeth secured to the sides of the frame some distance apart, and an additional device connected to the apex of the frame for rocking said frame vertically independently of the first named device.

3. A road scarifier comprising a wheel truck, a frame pivotally mounted on the truck for horizontal rotary adjustment. supporting members for the apex of the frame located at opposite ends of the truck a distance from the pivot of the frame corresponding to the distance between said pivot and apex of said frame, and separate devices on opposite ends of the truck for raising and lowering said supporting members and thereby rocking the frame which may be attached to said members vertically.

4. A road scarifier comprising a wheeled truck, a frame mounted on the truck for horizontal rotary adjustment, supporting members for the front of the frame at opposite sides of its axis of movement, and means for raising and lowering said supporting members and thereby vertically rocking the frame.

5. A road scarifier comprising a wheel truck, a bar running transversely under the truck, a frame swivelly connected to the bar, separate devices connected to the bar at opposite sides of the swivel for tilting the bar and thereby the frame vertically, teeth secured to the frame and an additional device connected to the forward end of the frame for rocking said frame vertically.

6. A road scarifier comprising a wheeled truck, a bar running transversely under the truck, a frame connected to the bar, separate devices connected to the bar at opposite sides of the connection of the frame to said bar for tilting the bar and thereby the frame, teeth secured to the frame, and an additional device connected to the forward end of the frame for rocking said frame vertically.

In witness whereof, I have hereunto set my hand this 26 day of August, 1912.

DAVID B. COOK.

Witnesses:
 EUGENE A. THOMPSON,
 EVA E. GREENLEAF,
 HOWARD P. DENISON.